Nov. 14, 1939.          D. S. DE LAVAUD          2,179,923
                         DISK DIFFERENTIAL
                        Filed May 17, 1938          2 Sheets-Sheet 1

INVENTOR:
DIMITRI SENSAUD DE LAVAUD
BY: Haseltine, Lake & Co.
ATTORNEYS

Nov. 14, 1939.  D. S. DE LAVAUD  2,179,923
DISK DIFFERENTIAL
Filed May 17, 1938  2 Sheets—Sheet 2

INVENTOR:
DIMITRI SENSAUD DE LAVAUD
BY: Haseltine, Lake & Co.
ATTORNEYS

Patented Nov. 14, 1939

2,179,923

UNITED STATES PATENT OFFICE 2,179,923

DISK DIFFERENTIAL

Dimitri Sensaud de Lavaud, Paris, France

Application May 17, 1938, Serial No. 208,347
In France May 27, 1937

2 Claims. (Cl. 74—389.5)

The present invention relates to improvements in disk differentials of the type of those described in United States Patent No. 2,060,558, of November 10, 1936, in which on each of the driven shafts are angularly fixed friction members alternating with other members which are angularly secured to a loose sleeve, the whole of said friction members, which are held resiliently pressed, being arranged between a cheek which is secured to the driving shaft and a sliding ring secured to said loose sleeve and having slopes on which bear balls or the like which bear on the other hand on slopes provided on an axially fixed medial ring which is angularly secured to the driving shaft, the differential as a whole being preferably symmetrical relative to said ring.

According to the present invention, the two pressure rings, which are arranged on either side of the medial driving ring, are normally spaced apart from each other by a resilient device such as an axial spring which bears on shoulders provided on said pressure rings, and causes a certain pressure between the friction members.

According to another feature of the present invention, the two pressure rings are angularly connected to each other but with a certain amount of play, so that one of said rings can rotate relatively to the other a sufficient amount for said ring to cease exerting a pressure on the disks and consequently allow the corresponding driven shaft to rotate loosely whereas the other driven shaft continues to be driven by the driving shaft.

In an embodiment which appears to be advantageous for the time being, the connection between the pressure rings is obtained by means of claw coupling having a certain amount of play between the teeth as indicated above.

According to the invention, the teeth may have straight flanks or flanks that are inclined at a suitably chosen angle for totally or partially compensating the wear of the friction disks.

The present invention also covers a number of particular points which will become apparent in the ensuing description taken in conjunction with the accompanying drawings which is only given by way of example and in which.

Figure 1:
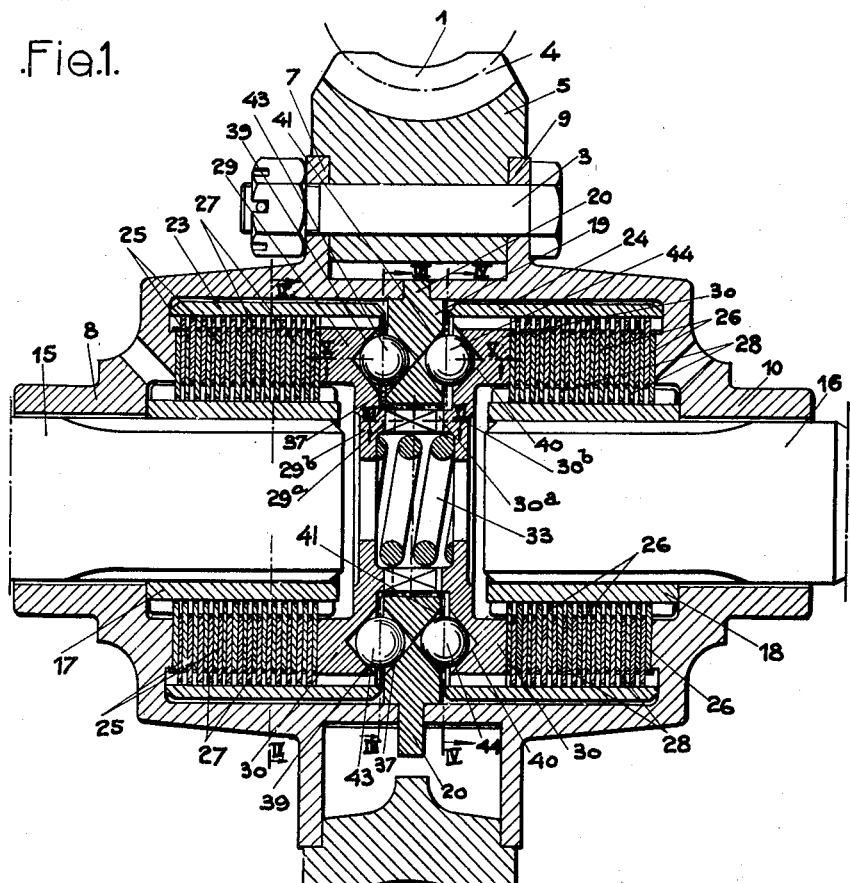
Fig. 1 is a view in axial section of a differential constructed according to the invention.

In the various figures of the drawings, the same reference numerals designate the same members. A driving shaft or propelling shaft 1 which is journalled in a case not shown is provided with a worm 4 or the like which meshes with a gear 5. Said gear 5 is secured by bolts 3 to two identical drums 7 and 9, respectively having hubs 8 and 10 in which are respectively journalled co-axial shafts 15 and 16. Said shafts are grooved at their end and identical bushes 17 and 18, which are likewise grooved, are fixed respectively to the ends of the shafts 15 and 16. The periphery of the bushes 17 and 18 is grooved.

A ring 19 is angularly and axially secured to the drums 7 and 9 and inside the latter, by any suitable means such as keys or projections 20 provided at the periphery of the ring 19 and engaging in suitable recesses provided in the lateral edges of the drums 7 and 9. Inside the drums 7 and 9 and on either side of the ring 19, are loosely mounted two sleeves 23 and 24 respectively located opposite the grooved bushes 17 and 18. Said sleeves 23 and 24 are internally splined. Between the sleeve 23 and the bush 17 are arranged friction disks 25 and 27 which respectively alternate with and are angularly secured to the bush 17 and the sleeve 23. Similarly, between the sleeve 24 and the bush 18 are arranged friction disks 26 and 28 which respectively alternate with and are angularly secured to the bush 18 and the sleeve 23.

Between the extreme disk 25 and the ring 19 is interposed a pressure ring 29 which is angularly secured to the sleeve 23 but can move axially; similarly, between the extreme disk 26 and the ring 19 is interposed a ring 30 which is angularly secured to the sleeve 24 but can move axially. The two rings 29 and 30 are angularly connected to each other but with a certain amount of play which allows them a certain angular movement as will be explained hereinafter.

Figure 7:
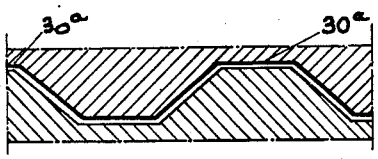
Fig. 7 is a view corresponding to Fig. 6, the teeth of the claw-clutch having inclined flanks.
Figure 6:
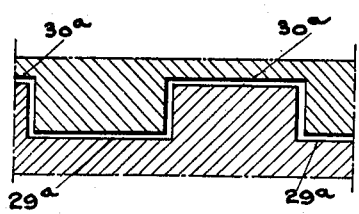
Fig. 6 is a partial sectional view along VI—VI of Fig. 1, the pressure rings being assumed to be developed and the teeth of the claw-clutch being straight flanked.
Figure 2:
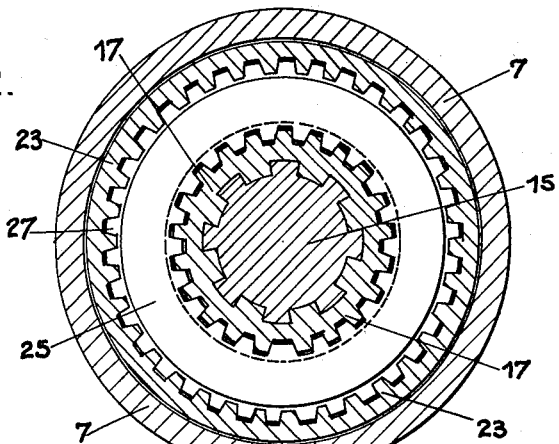
Fig. 2 is a section according to line II—II of Fig. 1.

For this purpose and in the present embodiment, the rings 29 and 30 are respectively provided with lateral teeth 29ª and 30ª which cooperate together like a claw-coupling which has a certain amount of play. The teeth or dogs 29ª and 30ª may have straight flanks as shown in Fig. 6 or have inclined flanks as shown in Fig. 7 for the purpose which will be explained hereinafter.

Furthermore, said rings 29 and 30 are respectively provided with shoulders 29<sup>b</sup> and 30<sup>b</sup> between which is interposed a spring 33 which tends to bring into contact with a certain amount of friction, the disks 25 and 27 on the one hand, and the disks 26 and 28 on the other hand.

Figure 3:
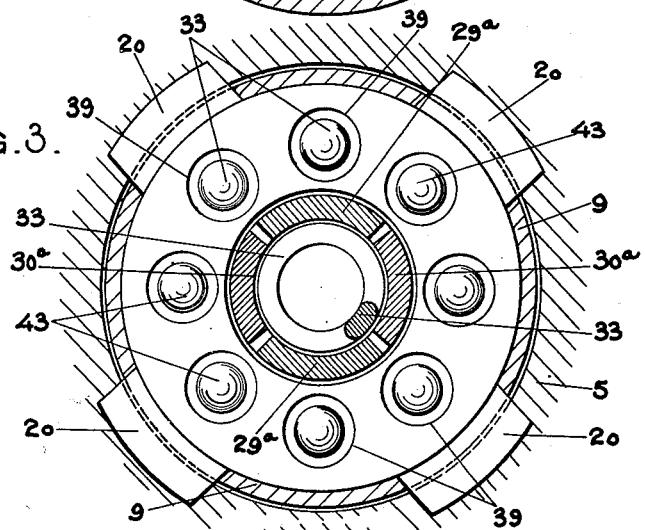
Fig. 3 is a section according to line III—III of Fig. 1.
Figure 4:
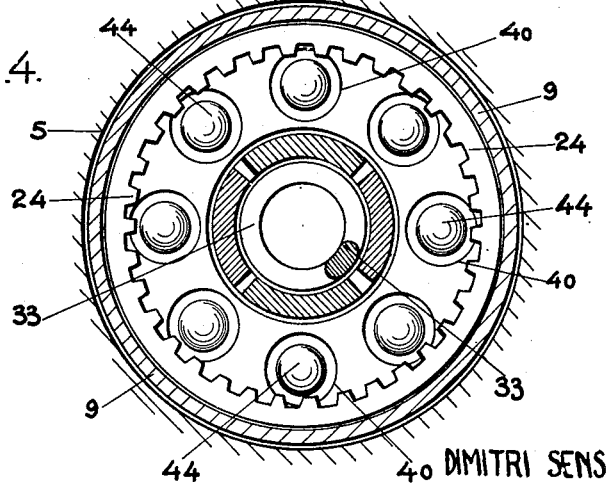
Fig. 4 is a section according to line IV—IV of Fig. 1.

On each of the faces of the ring 19 and on the face located opposite each of the rings 29 and 30, are provided respectively conical recesses or slopes 37 and 39 on the one hand, and 40 and 41 on the other hand. Between said slopes 37 and 39 and 40 and 41 are respectively arranged balls 43 and 44. Said conical recesses and said balls are distributed over the periphery of the rings as is better shown in Figs. 3 and 4.

The operation is as follows:

When the driving shaft 1 is rotated, it drives, through the intermediary of the worm and worm wheel mechanism, the drums 7 and 9 which are secured to the wheel 5. Said drums 7 and 9 in turn drive the medial ring 19. As the shafts 15 and 16 are stationary and also the bushes 17 and 18, they brake, through the intermediary of the respective friction disks, the loose sleeves which remain stationary. There is therefore a relative angular movement between the rings 29 and 30 and the medial ring 19. The balls 43 and 44 move respectively between the slopes 37 and 39 and 40 and 41 and axially push back the rings 29 and 30 which thus firmly press the friction disks against each other thereby causing the driven shafts 15 and 16 to be simultaneously and immediately driven whatever be the direction of rotation of the driving shaft 1 owing to the symmetry of the slopes, the extreme rings 25 and 26 being respectively pressed against the inner lateral faces of the drums 7 and 9.

Figure 5:
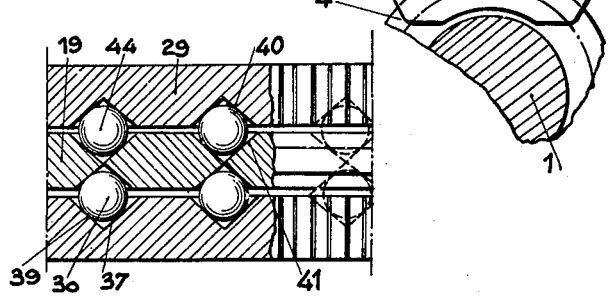
Fig. 5 is a partial sectional view along V—V of Fig. 1, the rings being assumed to be developed.

If, for any reason, such as a decrease of resistance, one of the driven shafts, for example the shaft 15, tends to rotate faster than the shaft 16, the ring 29 which is secured to same by friction, will tend to rotate faster than the ring 30 and consequently than the medial ring 19, the speed of which cannot exceed that of the ring which is rotating at the lowest speed. Owing to the play which exists in the claw-coupling 29<sup>a</sup> and 30<sup>a</sup> provided between the rings 29 and 30, said ring 29 comes into the position shown diagrammatically in Fig. 5, in which the play has been exaggerated in order to facilitate comprehension, and consequently unwedges the ball 43 from between the slopes 37 and 39 and consequently releases the pressure between the disks 25 and 27, the ring 29 and the drum 7, only allowing the residual pressure produced by the spring 33 to remain, which pressure is insufficient to drive the driven shaft 15. As soon as the speed of the driven shaft 15 decreases and owing to said residual friction and to the claw-coupling 29<sup>a</sup> and 30<sup>a</sup>, it will be seen that the sleeve 23 and consequently the ring 29 are braked relatively to the ring 19 and the ball 43 again pushes back said ring 29 owing to the movement of said ball on the walls of the conical cavities 37 and 39.

A similar operation would be obtained for the shaft 16 if the latter tended to rotate faster than the shaft 15.

It will be readily understood that if the teeth of the claw-clutch have inclined flanks, when the friction disks wear, the play between the flanks of the teeth increases and thereby automatically compensates the play produced by the wear.

It is obvious that the invention is not limited to the embodiment described and illustrated above, but covers all the embodiments involving the features set forth above and fulfilling the intended purpose.

What I claim as my invention and desire to secure by Letters Patent is:

1. In a friction disk differential gear, in combination: a drum rotated from a driving shaft, two coaxial driven shafts journalled in the said drum, a driving ring keyed on the drum and arranged between the said shafts, friction disks keyed upon the said shafts, two lateral rings arranged each upon a side of the driving ring, balls interposed between opposed notches provided in the said rings for axially moving the lateral rings when occurs an angular displacement of the latter relatively to the driving ring, a hub upon one of the lateral rings protruding into the central opening of the driving ring and adapted to clutch with play with a similar hub of the other lateral ring, a spring interposed between the said lateral rings for spacing apart the same, and friction disks keyed upon the lateral rings and adapted for frictionally engaging the corresponding friction rings keyed upon the driven shafts.

2. In a friction disk differential gear, in combination: a drum rotated from a driving shaft, two co-axial driven shafts journalled in the said drum, a driving ring keyed on the drum and arranged between the said shafts, friction disks keyed upon the said shafts, two lateral rings arranged each upon a side of the driving ring, balls interposed between opposed notches provided in the said rings for axially moving the lateral rings when occurs an angular displacement of the latter relatively to the driving ring, a hub upon one of the lateral rings protruding into the central opening of the driving ring and provided with teeth having converging flanks and adapted to engage similar teeth provided upon a corresponding hub of the other lateral ring, a spring interposed between the said lateral rings for spacing apart the same, and friction disks keyed upon the lateral rings and adapted for frictionally engaging the corresponding friction rings keyed upon the driven shafts.

DIMITRI SENSAUD DE LAVAUD.